April 14, 1942.  W. V. HOBBS  2,279,888
CONTROL SYSTEM
Filed May 31, 1940  2 Sheets-Sheet 1
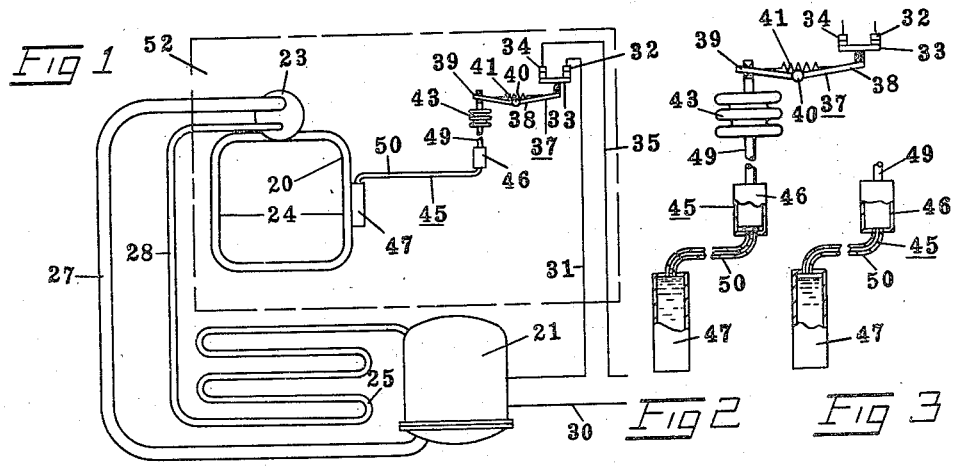
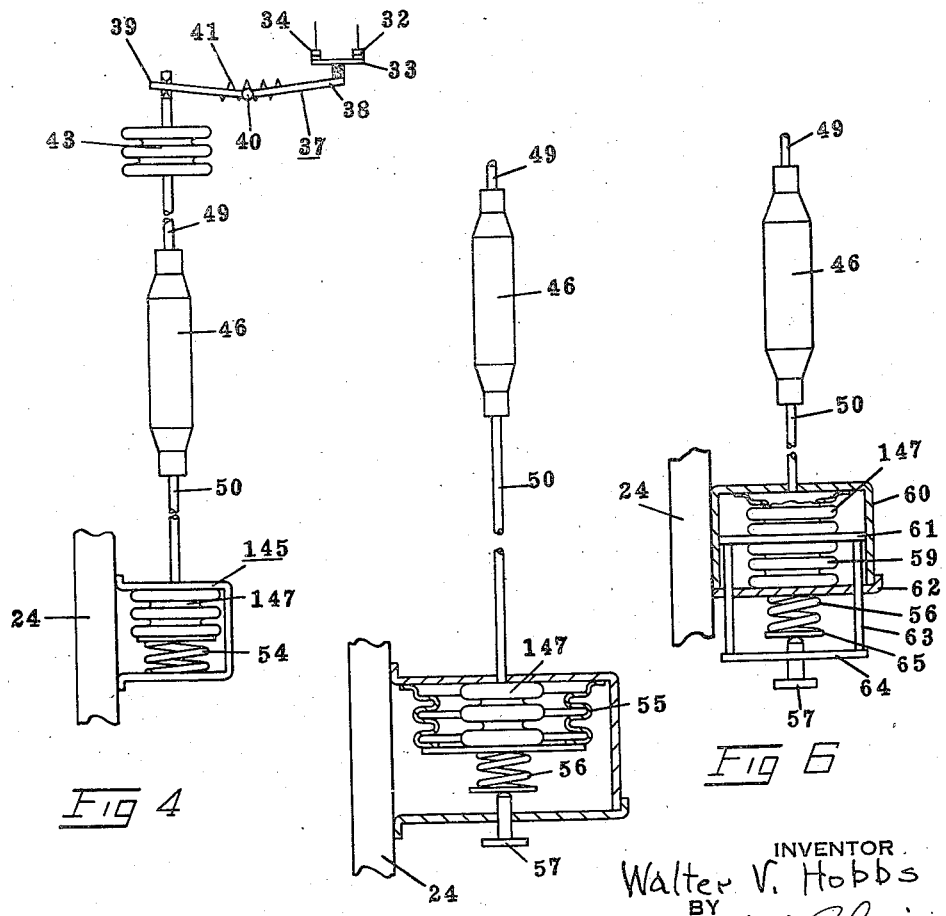
INVENTOR
Walter V. Hobbs
BY
ATTORNEY April 14, 1942.　　　W. V. HOBBS　　　2,279,888
CONTROL SYSTEM
Filed May 31, 1940　　　2 Sheets-Sheet 2

INVENTOR
Walter V. Hobbs
BY
ATTORNEY

Patented Apr. 14, 1942

2,279,888

UNITED STATES PATENT OFFICE 2,279,888

CONTROL SYSTEM

Walter V. Hobbs, Columbus, Ohio, assignor to Ranco Incorporated, Columbus, Ohio, a corporation of Ohio Application May 31, 1940, Serial No. 338,002

23 Claims. (Cl. 62—4)

The present invention relates to refrigerating apparatus and particularly to the control of the apparatus from a plurality of different refrigerated zones.

One of the objects of the present invention is to provide a refrigerating apparatus in which the running phase and the inactive phase of the cycle of the refrigerant circulating mechanism is controlled by a system containing a volatile liquid and in which the change in temperature or pressure in the system is utilized for changing from one phase of the cycle of the circulating mechanism to the other when gas of the liquid recondenses in a portion of the system which is always subjected to the temperature of the heat absorber and from which it overflowed during the said one phase of the cycle.

Another object of the present invention is to provide a refrigerating apparatus in which the phases of operation thereof are controlled by a system containing a volatile liquid and in which changes in temperature are utilized to vary the capacity of a portion of the system so that at times, the capacity thereof is insufficient to hold all of the liquid whereby the liquid flows to another portion of the system which is subjected to a different refrigerating temperature and in which the change in temperature or pressure in said other portion of the system, when gas of the liquid recondenses in the first mentioned portion, is utilized for changing from one phase of operation of the system to the other.

Other and further objects and advantages will be apparent from the following description, reference being had to the accompanying drawings wherein preferred forms of embodiments of the present invention are clearly shown.

In the drawings:

Fig. 1 is a diagrammatic view showing one form of the invention;

Fig. 2 is a diagrammatic view of the fluid system of the control showing liquid in a plurality of remote portions of the system;

Fig. 3 is a view similar to that shown in Fig. 2, but showing all of the liquid in one portion of the system;

Figs. 4, 5 and 6 are diagrammatic views of control systems, each showing a different embodiment of the invention;

Figure 7:
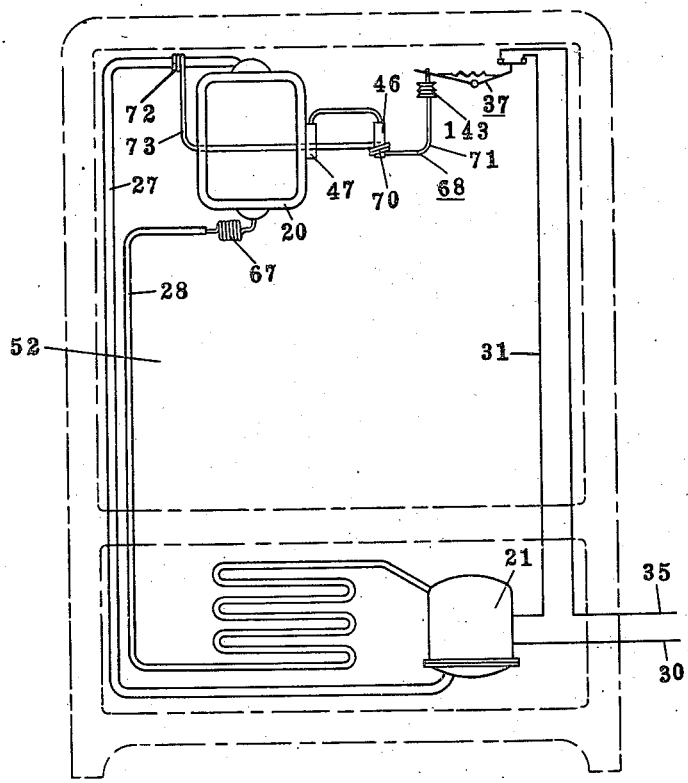
Fig. 7 is a diagrammatic view of a refrigerating apparatus and also a diagrammatic view of a control system, which control system shows another embodiment of the invention.
Figures 8, 9:
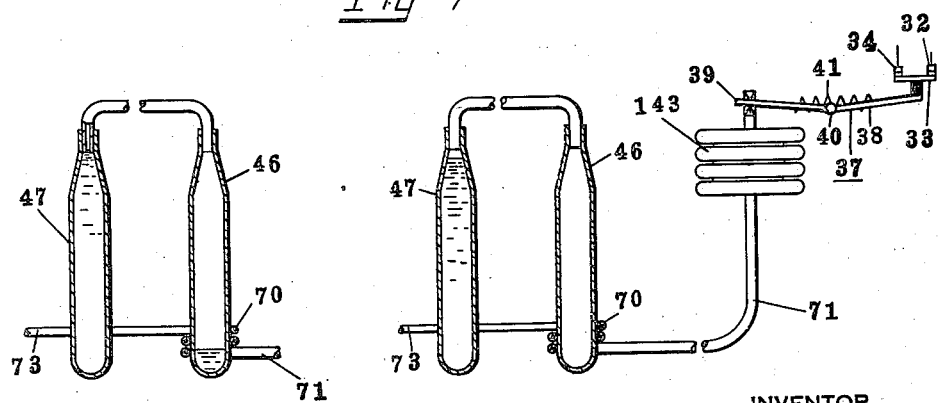
Fig. 8 is a diagrammatic view of a portion of the control system shown in Fig. 7, and showing all of the volatile liquid in one portion of the control system.
Fig. 9 is a view similar to Fig. 8 but showing part of the liquid in two portions of the control system.

Referring to the drawings and particularly Figs. 1, 2 and 3, there is shown, for the purpose of illustrating one form of the invention, a refrigerating system of the compressor-condenser-expander type wherein the heat absorber is illustrated as the evaporator 20, and the means for circulating refrigerant through the evaporator as a compressor 21. The evaporator includes a header 23 from which depends tubular walls 24. The header may contain a float valve (not shown) for controlling the flow of refrigerant from the condenser 25 to the evaporator 20. Gaseous refrigerant is withdrawn from the header 23 by the compressor 21 through the pipe 27. The refrigerant is compressed by the compressor 21 and forced into the condenser 25, whence the liquid refrigerant flows to the header by pipe 28.

The circuit for the compressor 21 includes a wire 30 and wire 31, stationary contact 32, movable contact 33, stationary contact 34 and wire 35. The contact 33 is actuated by a suitable snap acting mechanism 37 which is diagrammatically shown as including two levers 38 and 39 pivotally supported at 40 and interconnected by a spring 41. Operating movement is imparted to the lever 39 by a bellows 43 and this operating movement is translated into snap acting movement of the lever 38 by moving the spring 41 on either side of its dead center position with respect to the pivot 40.

The control system, generally indicated by 45 includes the bellows 43, a bulb 46 and a bulb 47. Bellows 43 is connected to bulb 46 by a tube 49 and the bulb 46 is connected to the bulb 47 by a tube 50. Preferably the tubes 49 and 50 are of very small diameter and are generally referred to by the trade as "capillary" tubes.

The evaporator 20 and the bulbs 46 and 47 are contained within an insulated compartment 52. The bellows 43 and the switch mechanism may be disposed outside of the compartment 52, provided the outside temperature is always above the temperature in the compartment, but in the present embodiment they are also inclosed.

In the present embodiment the bulb 47 is in intimate thermal contact with the evaporator 20 and therefore assumes or closely follows the temperature of the evaporator while the bulb 46 is disposed remotely from the evaporator and consequently is subjected to the medium, in this particular example air, cooled by the evaporator. The system 45 contains a limited quantity of volatile liquid which liquid, as a liquid, expands and contracts when subjected to increased and decreased temperatures. The capacity of the bulb 47 and the quantity of liquid contained in the system is so computed that all of the liquid of the system is contained in the bulb 47 when the evaporator is at the desired minimum temperature. When the temperature of the evaporator and likewise the liquid within bulb 47 increases, the liquid expands and flows into the bulb 46 through the tube 50. The liquid in the bulb 46 will then be responsive to the temperature of the air in the compartment 52 remote from the evaporator 20. When the pressure within the system attains a predetermined high value, computed with the desired maximum temperature of the air at the position of the bulb 46, the bellows will have expanded sufficiently to move the snap acting mechanism to the position shown in Fig. 1. This completes the circuit to the motor 21. The liquid level at this time is diagrammatically shown in Fig. 2.

The operation of the compressor will cause a reduction in temperature of the evaporator with the consequent effect of reducing the temperature of the liquid in the bulb 47. When all of the liquid is condensed within the bulb 47, as shown in Fig. 3, the liquid is no longer subjected to the temperature of the air and as soon as this liquid is subjected only to the evaporator temperature, the pressure within the system is greatly reduced.

Since the system 45 starts the running phase of the compressor in response to the temperature of the air remote from the evaporator and starts the inactive phase in response to the temperature of the evaporator, a switch may be used having a wide differential while still maintaining the desirable accurate temperature control. Switches with wide differential between the closing and opening thereof can be made ruggedly and at a lower cost than switches having a narrow differential.

When the present type of control system is used, the compressor 21 is maintained operative until a desired minimum temperature is obtained in the evaporator. Also the compressor starts its refrigerating function when the air attains a predetermined high value. If desirable the capacity of the bulb 47 and the liquid content of the system 45 may be computed so that no liquid overflows from the bulb 47 to the bulb 46 until the temperature of the evaporator has attained a predetermined high value as, for example, above 32 degrees F. This will insure cyclical defrosting of the evaporator.

In the system 145 shown in Fig. 4 the bulb 147 is in the form of a bellows and is also in intimate thermal contact with the wall 24 of the evaporator 20. A spring 54 is interposed between the free movable end wall of the bellows 147 and the bellows support. In this embodiment, a decrease in temperature of the evaporator will cause a relative decrease in temperature of the liquid within bellows 147 with the consequent effect of moving the bellows towards a collapsed position. When this occurs, the liquid will be forced out of the bellows 147 and through pipe 49 and into the bulb 46. The bulb 46, being remote from the evaporator 20, will impart a temperature to the liquid therein corresponding to the temperature of the air thereabout. When the air about 46 attains a predetermined desired low tempera-ture, the pressure within the system will have decreased sufficiently to impart the opening movement to the switch 37 through the bellows 43. The compressor will then be stopped and the temperature of the evaporator will rise. The temperature of the evaporator 20 and the air within compartment 52 wil gradually increase causing an increase in pressure in the system 145. This will cause expansion of the bellows 147 until its capacity is sufficient to hold all of the liquid contained in the system 145. Obviously, all condensation will take place within bellows 147 when the bellows is expanded sufficiently to retain all of the condensate because it is the coldest part of the entire system. As the temperature of the evaporator increases, the pressure within system 145 will increase and when the pressure within system 145 attains a predetermined high value, computed with respect to a maximum temperature desired of the evaporator, the bellows 43 will have expanded sufficiently to close the switch 37 to start the compressor 21. As previously stated, as the temperature of the evaporator decreases, collapsing of the bellows 147 will force liquid into the bulb 46. In this manner the running phase of the compressor is stopped when the temperature of the air attains a predetermined low value and the running phase of the cycle is started when the evaporator attains a predetermined high temperature. By reason of this arrangement, cyclic defrosting of the evaporator can be assured, if desirable, since the controller can be adjusted so that the compressor is not started until the evaporator attains a temperature above 32 degrees F.

The embodiment illustrated in Fig. 5 is similar to that disclosed in Fig. 4. In the embodiment shown in Fig. 5, there is provided a bellows 55 in addition to the bellows 147. This bellows 55 is in intimate thermal contact with the evaporator wall 24 and contains a volatile fluid which is always partly vapor and partly liquid within the normal range of operation of the system. This bellows is adapted to move toward collapsed and toward expanded positions, respectively, with decrease and increase in temperatures of the evaporator. It is arranged to augment the action of bellows 147 and in the particular illustration, it surrounds bellows 147. The effect of bellows 147 and 55 can be controlled by adjusting the tension of the spring 56 by a thumb screw 57. By reason of this adjustment the temperatures at which the system 145 responds may be varied.

The embodiment illustrated in Fig. 6 is also similar to that shown in Figs. 4 and 5, but in this embodiment bellows 59 opposes the bellows 147, that is when the bellows 59 and 147 are decreased in temperature the fluids contained in these respective bellows are decreased in pressure and both bellows tend to move toward collapsed position, and conversely, when the pressure of the fluid increases, due to increase in temperature, this increased pressure tends to expand both bellows. The open end of bellows 147 is sealed by and to the lower side of the upper yoke 60 and the lower closed side of bellows 147 abuts a plate 61. The upper closed side of bellows 59 abuts the lowers side of the plate 61 and the lower closed side of bellows 59 abuts a stationary plate 62 which is suitably attached to the yoke 60. Pins 63 are attached to the plate 61 and to a plate 64. The spring 56 is interposed between the lower side of plate 62 and a spring cap 65. A thumb screw 57 is threaded into the plate 64 and abuts the spring cap 65, and can be adjusted for changing the pressure of the spring 56.

The bellows 59 is constructed or arranged to have an overpowering influence over the bellows 147. It may be larger in diameter so as to have a greater force than the bellows 147 with equal changes in temperature of the fluids contained therein, but in the embodiment illustrated it contains a fluid which is always partly liquid and partly vapor during normal operation but having the characteristics of being capable of greater changes in pressure than the bellows 147 with corresponding changes in temperature. Thus during cooling of both the bellows 59 and 147, the collapsing effect of bellows 59 will be greater than the collapsing effect of bellows 147 whereby bellows 147 will be expanded, and, conversely during increase in temperature of bellows 59 and 147, the expansion effect of bellows 59 will be greater than bellows 147.

In the embodiment shown in Fig. 7, there is illustrated another well known compressor-condenser-expander type refrigerator. Instead of employing a float valve, as the pressure reducing element, there is shown a restrictor 67 interposed between the outlet of the pipe 28 and the inlet of the evaporator 20. Obviously this apparatus can be employed in connection with the other embodiment of the invention and vice versa. In this system, bulbs 46 and 47 are employed but in addition thereto, a secondary system 68 is employed. This system 68 includes a bulb in the form of a coil of tubing 70 which intimately embraces bulb 46, a switch bellows 143 and an interconnecting tube 71. The bulb 47 is in intimate thermal contact with the evaporator and therefore assumes or closely follows the temperature thereof while the bulb 46 is remote from the evaporator and responsive to the temperature of the air in the inclosure 52.

During the heating phase of the evaporator 20, the liquid in bulb 47 will overflow into bulb 46 and the liquid entering bulb 46 will assume the temperature of the air. As the temperature of the air increases, the pressure of the fluid within the coil 70, pipe 71 and bellows 143 will increase and, when this pressure increases to predetermined high value, corresponding to a predetermined maximum desired temperature of the air, the switch 37 will be closed to start the running phase of the compressor 21. This will cause cooling of the evaporator 20. The cooling of the evaporator will continue until the temperature of the bulb 70 attains a predetermined low value, at which time the pressure within the bulb 70, pipe 71 and bellows 143 will be decreased sufficiently to collapse the bellows 143 sufficiently to open the switch 37. The temperature of the bulb 70 must be decreased to a temperature considerably lower than the temperature of the air before the bellows is collapsed sufficiently to open switch 37 and this cooling of the bulb 70 is effected only after the evaporator 20 is cooled sufficiently to contract the liquid in the bulb 47 to such an extent that condensation of gas of the liquid is taking place in bulb 47. When condensation takes place in bulb 47, vaporization of the liquid in bulb 46 is taking place which in effect causes a material decrease in the temperature of the bulb 46.

Accurate temperatures can be maintained although the switch is opened at a relatively low pressure in bellows 143 and closed at a materially higher pressure. Here again a wide differential switch may be employed.

In the event that switch 37 is closed either manually by mistake or by an abnormal condition of the refrigerating apparatus when no liquid is contained within bulb 46, the secondary system 68 in itself will function to stop the refrigerator compressor prior to the cooling of the air to a detrimental state. This is accomplished by causing the secondary system 68 to be affected by the temperature of the outlet pipe 27. It is well known that when the evaporator is cooled excessively part of the refrigerant vaporizes in the pipe leading from the evaporator to the compressor. When this occurs there is a material reduction in the temperature of the outlet pipe. Therefore a bulb 72 of the thermostatic system is connected with the outlet pipe 27 by a tube 73. Now, in the event of excessive cooling, the bulb 72 will be decreased to a temperature sufficiently to reduce the pressure within the thermostatic system 68 sufficiently to collapse the bellows 143 and open the switch 37. It is to be understood, however, that during normal operation, the bulb 70 is cooler than the bulb 72, and therefore, the bulb 70 normally controls the pressure in the secondary system 68.

From the foregoing it will be seen that I have provided a refrigerating apparatus in which the phases of the cycles of operation thereof can be controlled from two different zones as, for example, the evaporator and the air in which a rugged and inexpensive switch may be employed, since the control system operates between wide variations of temperature and pressure.

While the forms of embodiments of the present invention as herein disclosed constitute preferred forms, it is to be understood that other forms might be adopted, all coming within the scope of the claims which follow.

I claim:

1. Refrigerating apparatus comprising in combination, a heat absorber; means for cyclically circulating refrigerant through the absorber, each of the cycles including a running phase and an inactive phase; and control means including a closed system containing a volatile liquid, one portion of said system being responsive substantially solely and at all times to the temperature of the heat absorber, the quantity of liquid contained in said system and the relative capacity of said portion being such that all of said liquid is contained in said portion under one normal operating temperature of the heat absorber and under another normal operating temperature of the heat absorber the capacity of said portion is insufficient to hold all said liquid, a second portion of said system being subjected to the medium cooled by the heat absorber and being connected with the first mentioned portion to receive the excess liquid from the first mentioned portion when the heat absorber is at the second mentioned operating temperature, and means responsive to condensation of the gas of the liquid in the first mentioned portion of said system for changing from one of the phases of the cycle of the circulating means to the other.

2. Refrigerating apparatus comprising in combination, a heat absorber; means for cyclically circulating refrigerant through the absorber, each of the cycles including a running phase and an inactive phase; and control means including a closed system containing a volatile liquid, one portion of said system being responsive substantially solely and at all times to the temperature of the heat absorber, the quantity of liquid contained in said system and the relative capacity of said portion being such that all of said liquid is contained in said portion under one normal operating temperature of the heat absorber and under another normal operating temperature of the heat absorber the capacity of said portion is insufficient to hold all said liquid, a second portion of said system being subjected to the medium cooled by the heat absorber and being connected with the first mentioned portion to receive the excess liquid from the first mentioned portion when the heat absorber is at the second mentioned operating temperature, and means responsive to a change in pressure in said system when condensation of the gas of the liquid takes place in the first mentioned portion for changing from one of the phases of the cycle of the circulating means to the other.

3. Refrigerating apparatus comprising in combination, a heat absorber; means for cyclically circulating refrigerant through the absorber, each of the cycles including a running phase and an inactive phase; and control means including a closed system containing a volatile liquid, one portion of said system being responsive substantially solely and at all times to the temperature of the heat absorber, the quantity of liquid contained in said system and the relative capacity of said portion being such that all of said liquid is contained in said portion under one normal operating temperature of the heat absorber and under another normal operating temperature of the heat absorber the capacity of said portion is insufficient to hold all said liquid, a second portion of said system being subjected to the medium cooled by the heat absorber and being connected with the first mentioned portion to receive the excess liquid from the first mentioned portion when the absorber is at the second mentioned operating temperature, and means responsive to a change in temperature of the second mentioned portion of the system when condensation of the gas of the liquid takes place in the first mentioned portion for changing from one of the phases of the cycle of the circulating means to the other.

4. Refrigerating apparatus comprising in combination, a heat absorber; means for cyclically circulating refrigerant through the absorber, each of the cycles including a running phase and an inactive phase; and control means including a closed system containing a volatile liquid, one portion of said system being responsive substantially solely and at all times to the temperature of the heat absorber, the quantity of liquid contained in said system and the relative capacity of said portion being such that all of said liquid is contained in said portion under one normal operating temperature of the heat absorber and under another normal operating temperature of the heat absorber the capacity of said portion is insufficient to hold all said liquid, a second portion of said system being subjected to the medium cooled by the heat absorber and being connected with the first mentioned portion to receive the excess liquid from the first mentioned portion when the heat absorber is at the second mentioned operating temperature, and means responsive to the pressure in said system when all the liquid is present in the first mentioned portion for changing from one of the phases of the cycle of the circulating means to the other and responsive to a predetermined pressure in the system when part of the liquid is contained in the other portion of the system for changing from said other phase of the cycle to the said one phase.

5. Refrigerating apparatus comprising in combination, a heat absorber; means for cyclically circulating refrigerant through the absorber, each of the cycles including a running phase and an inactive phase; and control means including a closed system containing a volatile liquid, one portion of said system being responsive substantially solely and at all times to the temperature of the heat absorber, the quantity of liquid contained in said system and the relative capacity of said portion being such that all of said liquid is contained in said portion under one normal operating temperature of the heat absorber and under another normal operating temperature of the heat absorber the capacity of said portion is insufficient to hold all said liquid, a second portion of said system being subjected to the medium cooled by the heat absorber and being connected with the first mentioned portion to receive the excess liquid from the first mentioned portion when the heat absorber is at the second mentioned operating temperature, and means responsive to the pressure in said system when all the liquid is present in the first mentioned portion for changing from the running phase of the cycle of the circulating means to the inactive phase and responsive to a predetermined pressure in the system when part of the liquid is contained in the other portion of the system for changing from said inactive phase to the running phase.

6. Refrigerating apparatus comprising in combination, a heat absorber; means for cyclically circulating refrigerant through the absorber, each of the cycles including a running phase and an inactive phase; and control means including a closed system containing a volatile liquid, one portion of said system being responsive substantially solely and at all times to the temperature of the heat absorber, the quantity of liquid contained in said system and the relative capacity of said portion being such that all of said liquid is contained in said portion under one normal operating temperature of the heat absorber and under another normal operating temperature of the heat absorber the capacity of said portion is insufficient to hold all said liquid, a second portion of said system being subjected to the medium cooled by the heat absorber and being connected with the first mentioned portion to receive the excess liquid from the first mentioned portion when the heat absorber is at the second mentioned operating temperature, and means responsive to the pressure in said system when all the liquid is present in the first mentioned portion for changing from the inactive phase of the cycle of the circulating means to the running phase and responsive to a predetermined pressure in the system when part of the liquid is contained in the other portion of the system for changing from said running phase to the inactive phase.

7. Refrigerating apparatus comprising in combination, a heat absorber; means for cyclically circulating refrigerant through the absorber, each of the cycles including a running phase and an inactive phase; and control means including a closed system containing a volatile liquid, one portion of said system being responsive substantially solely and at all times to the temperature of the heat absorber, the quantity of liqid contained in said system and the relative capacity of said portion being such that all of said liquid is contained in said portion when the heat absorber is relatively cold and insufficient to hold all of said liquid when the heat absorber is relatively warm during normal operation of the refrigerating apparatus, and means responsive to condensation of the gas of the liquid in the first mentioned portion of said system for changing from one of the phases of the cycle of the circulating means to the other.

8. Refrigerating apparatus comprising in combination, a heat absorber; means for cyclically circulating refrigerant through the absorber, each of the cycles including a running phase and an inactive phase; and control means including a closed system containing a volatile liquid, one portion of said system being responsive substantially solely and at all times to the temperature of the heat absorber, the quantity of liquid contained in said system and the relative capacity of said portion being such that all of said liquid is contained in said portion when the heat absorber is relatively cold and insufficient to hold all of said liquid when the heat absorber is relatively warm during normal operation of the refrigerating apparatus, and means responsive to a change in pressure in said system when condensation of the gas of the liquid takes place in the first mentioned portion for changing from one of the phases of the cycle of the circulating means to the other.

9. Refrigerating apparatus comprising in combination, a heat absorber; means for cyclically circulating refrigerant through the absorber, each of the cycles including a running phase and an inactive phase; and control means including a closed system containing a volatile liquid, one portion of said system being responsive substantially solely and at all times to the temperature of the heat absorber, the quantity of liquid contained in said system and the relative capacity of said portion being such that all of said liquid is contained in said portion when the heat absorber is relatively cold and insufficient to hold all of said liquid when the heat absorber is relatively warm during normal operation of the refrigerating apparatus, and means responsive to a change in temperature of the second mentioned portion of the system when condensation of the gas of the liquid takes place in the first mentioned portion for changing from one of the phases of the cycle of the circulating means to the other.

10. Refrigerating apparatus comprising in combination, a heat absorber; means for cyclically circulating refrigerant through the absorber, each of said cycles including a running phase and an inactive phase; and control means including a closed system containing a volatile liquid, one portion of said system having a capacity variable with changes in temperature and the quantity of liquid contained in said system and the capacity of said portion being such that all of said liquid is contained in said portion under one normal operating temperature to which said portion is subjected and under another normal operating temperature the capacity of said portion is insufficient to hold all said liquid, a second portion of said system being connected with the first mentioned portion to receive the excess liquid when the first mentioned portion is at the second mentioned operating temperature, said portions being spaced from one another and subjected to different temperatures, and means responsive to condensation of the gas of the liquid in the first mentioned portion of said system for changing from one of the phases of the cycle of the circulating means to the other.

11. Refrigerating apparatus comprising in combination, a heat absorber; means for cyclically circulating refrigerant through the absorber, each of said cycles including a running phase and an inactive phase; and control means including a closed system containing a volatile liquid, one portion of said system having a capacity variable with changes in temperature and the quantity of liquid contained in said system and the capacity of said portion being such that all of said liquid is contained in said portion under one normal operating temperature to which said portion is subjected and under another normal operating temperature the capacity of said portion is insufficient to hold all said liquid, a second portion of said system being connected with the first mentioned portion to receive the excess liquid when the first mentioned portion is at the second mentioned operating temperature, said portions being spaced from one another and subjected to different temperatures, and means responsive to a change in pressure in said system when condensation of the gas of the liquid takes place in the first mentioned portion for changing from one of the phases of the cycle of the circulating means to the other.

12. Refrigerating apparatus comprising in combination, a heat absorber; means for cyclically circulating refrigerant through the absorber, each of said cycles including a running phase and an inactive phase; and control means including a closed system containing a volatile liquid, one portion of said system being responsive substantially solely and at all times to the temperature of the heat absorber and having a capacity variable with changes in temperature of the heat absorber and the quantity of liquid contained in said system and the capacity of said portion being such that all of said liquid is contained in said portion under one normal operating temperature of the heat absorber and under another normal operating temperature of the heat absorber the capacity of said portion is insufficient to hold all said liquid, a second portion of said system being connected with the first mentioned portion to receive the excess liquid when the first mentioned portion is at the second mentioned operating temperature, said second mentioned portion being subjected to the medium cooled by the heat absorber, and means responsive to condensation of the gas of the liquid in the first mentioned portion of said system for changing from one of the phases of the cycle of the circulating means to the other.

13. Refrigerating apparatus comprising in combination, a heat absorber; means for cyclically circulating refrigerant through the absorber, each of said cycles including a running phase and an inactive phase; and control means including a closed system containing a volatile liquid, one portion of said system being responsive substantially solely and at all times to the temperature of the heat absorber and having a capacity variable with changes in temperature of the heat absorber and the quantity of liquid contained in said system and the capacity of said portion being such that all of said liquid is contained in said portion under one normal operating temperature of the heat absorber and under another normal operating temperature of the heat absorber the capacity of said portion is insufficient to hold all said liquid, a second portion of said system being connected with the first mentioned portion to receive the excess liquid when the first mentioned portion is at the second mentioned operating temperature, said second mentioned portion being subjected to the medium cooled by the heat absorber, and means responsive to a change in pressure in said system when condensation of the gas of the liquid takes place in the first mentioned portion for changing from one of the phases of the cycle of the circulating means to the other.

14. Refrigerating apparatus comprising in combination, a heat absorber; means for cyclically circulating refrigerant through the absorber, each of said cycles including a running phase and an inactive phase; and control means including a closed system containing a volatile liquid, one portion of said system having a capacity variable with changes in temperature and the quantity of liquid contained in said system and the capacity of said portion being such that all of said liquid is contained in said portion under one normal operating temperature to which said portion is subjected and under another normal operating temperature the capacity of said portion is insufficient to hold all said liquid, a second portion of said system being connected with the first mentioned portion to receive the excess liquid when the first mentioned portion is at the second mentioned operating temperature, said portion being spaced from one another and subjected to different temperatures, and means responsive to the pressure in said system when all the liquid is present in the first mentioned portion for changing from one of the phases of the cycle of the circulating means to the other and responsive to a predetermined pressure in the system when part of the liquid is contained in the other portion of the system for changing from said other phase of the cycle to the said one phase.

15. Refrigerating apparatus comprising in combination, a heat absorber; means for cyclically circulating refrigerant through the absorber, each of said cycles including a running phase and an inactive phase; and control means including a closed system containing a volatile liquid, one portion of said system having a capacity variable with changes in temperature and the quantity of liquid contained in said system and the capacity of said portion being such that all of said liquid is contained in said portion under one normal operating temperature to which said portion is subjected and under another normal operating temperature the capacity of said portion is insufficient to hold all said liquid, a second portion of said system being connected with the first mentioned portion to receive the excess liquid when the first mentioned portion is at the second mentioned operating temperature, said portions being spaced from one another and subjected to different temperatures, and means responsive to the pressure in said system when all liquid is present in the first mentioned portion for changing from the inactive phase of the cycle of the circulating means to the running phase and responsive to a predetermined pressure in the system when part of the liquid is contained in the other portion of the system for changing from said running phase to the inactive phase.

16. Refrigerating apparatus comprising in combination, a heat absorber; means for cyclically circulating refrigerant through the absorber, each of said cycles including a running phase and an inactive phase; and control means including a closed system containing a volatile liquid, one portion of said system being responsive substantially solely and at all times to the temperature of the heat absorber and having a capacity variable with changes in temperature of the heat absorber and the quantity of liquid contained in said system and the capacity of said portion being such that all of said liquid is contained in said portion under one normal operating temperature of the heat absorber and under another normal operating temperature of the heat absorber the capacity of said portion is insufficient to hold all said liquid, a second portion of said system being connected with the first mentioned portion to receive the excess liquid when the first mentioned portion is at the second mentioned operating temperature, said second mentioned portion being subjected to the medium cooled by the heat absorber, and means responsive to the pressure in said system when all liquid is present in the first mentioned portion for changing from the inactive phase of the cycle of the circulating means to the running phase and responsive to a predetermined pressure in the system when part of the liquid is contained in the other portion of the system for changing from said running phase to the inactive phase.

17. Refrigerating apparatus comprising in combination, a heat absorber; means for cyclically circulating refrigerant through the absorber, each of said cycles including a running phase and an inactive phase; and control means including a closed system containing a volatile liquid, one portion of said system having a capacity variable with changes in temperature, means responsive to temperature for varying the capacity of said portion, the quantity of liquid contained in said system and the capacity of said portion being such that all of said liquid is contained in said system and the capacity of said portion being such that all of said liquid is contained in said portion under one normal operating temperature of said temperature responsive means and under another normal operating temperature of the temperature responsive means the capacity of said portion is insufficient to hold all said liquid, a second portion of said system being connected with the first mentioned portion to receive the excess liquid when the first mentioned portion is at the second mentioned operating temperature, said temperature responsive means and the second mentioned portion of said system being spaced from one another and subjected to different temperatures, and means responsive to condensation of the gas of the liquid in the first mentioned portion of said system for changing from one of the phases of the cycle of the circulating means to the other.

18. Refrigerating apparatus comprising in combination, a heat absorber; means for cyclically circulating refrigerant through the absorber, each of said cycles including a running phase and an inactive phase; and control means including a closed system containing a volatile liquid, one portion of said system having a capacity variable with changes in temperature; means responsive to temperature for varying the capacity of said portion, the quantity of liquid contained in said system and the capacity of said portion being such that all of said liquid is contained in said portion under one normal operating temperature of said temperature responsive means and under another normal operating temperature of the temperature responsive means the capacity of said portion is insufficient to hold all said liquid, a second portion of said system being connected with the first mentioned portion to receive the excess liquid when the first mentioned portion is at the second mentioned operating temperature, said temperature responsive means and the second mentioned portion of said system being spaced from one another and subjected to different temperatures; and means responsive to changes in pressure in said system when condensation of the gas of the liquid takes place in the first mentioned portion for changing from one of the phases of the cycle of the circulating means to the other.

19. Refrigerating apparatus comprising in combination, a heat absorber; means for cyclically circulating refrigerant through the absorber, each of said cycles including a running phase and an inactive phase; and control means including a closed system containing a volatile liquid, one portion of said system having a capacity variable with changes in temperature, means responsive solely and at all times to the temperature of the heat absorber for varying the capacity of said portion, the quantity of liquid contained in said system and the capacity of said portion being such that all of said liquid is contained in said portion under one normal operating temperature of said temperature responsive means and under another normal operating temperature of the temperature responsive means the capacity of said portion is insufficient to hold all said liquid, a second portion of said system being connected with the first mentioned portion to receive the excess liquid when the first mentioned portion is at the second mentioned operating temperature, said second mentioned portion being subjected to the medium cooled by the heat absorber, and means responsive to condensation of the gas of the liquid in the first mentioned portion of said system for changing from one of the phases of the cycle of the circulating means to the other.

20. Refrigerating apparatus comprising in combination, a heat absorber; means for cyclically circulating refrigerant through the absorber, each of said cycles including a running phase and an inactive phase; and control means including a closed system containing a volatile liquid, one portion of said system having a capacity variable with changes in temperature, means responsive solely and at all times to the temperature of the heat absorber for varying the capacity of said portion, the quantity of liquid contained in said system and the capacity of said portion being such that all of said liquid is contained in said portion under one normal operating temperature of said temperature responsive means and under another normal operating temperature of the temperature responsive means the capacity of said portion is insufficient to hold all said liquid, a second portion of said system being connected with the first mentioned portion to receive the excess liquid when the first mentioned portion is at the second mentioned operating temperature, said second mentioned portion being subjected to the medium cooled by the heat absorber, and means responsive to a change in pressure in said system when condensation of the gas of the liquid takes place in the first mentioned portion for changing from one of the phases of the cycle of the circulating means to the other.

21. Refrigerating apparatus comprising in combination, a heat absorber; means for cyclically circulating refrigerant through the absorber, each of said cycles including a running phase and an inactive phase; and control means including a closed system containing a volatile liquid; one portion of said system having a capacity variable with changes in temperature, means responsive to temperature for varying the capacity of said portion, the quantity of liquid contained in said system and the capacity of said portion being such that all of said liquid is contained in said portion under one normal operating temperature of said temperature responsive means and under another normal operating temperature of the temperature responsive means the capacity of said portion is insufficient to hold all said liquid, a second portion of said system being connected with the first mentioned portion to receive the excess liquid when the first mentioned portion is at the second mentioned operating temperature, said temperature responsive means and the second mentioned portion of said system being spaced from one another and subjected to different temperatures, and means responsive to the pressure in said system when all the liquid is present in the first mentioned portion for changing from one of the phases of the cycle of the circulating means to the other and responsive to a predetermined pressure in the system when part of the liquid is contained in the other portion of the system for changing from said other phase of the cycle to the said one phase.

22. Refrigerating apparatus comprising in combination, a heat absorber; means for cyclically circulating refrigerant through the absorber, each of said cycles including a running phase and an inactive phase; and control means including a closed system containing a volatile liquid; one portion of said system having a capacity variable with changes in temperature, means responsive to temperature for varying the capacity of said portion, the quantity of liquid contained in said system and the capacity of said portion being such that all of said liquid is contained in said portion under one normal operating temperature of said temperature responsive means and under another normal operating temperature of the temperature responsive means the capacity of said portion is insufficient to hold all said liquid, a second portion of said system being connected with the first mentioned portion to receive the excess liquid when the first mentioned portion is at the second mentioned operating temperature, said temperature responsive means and the second mentioned portion of said system being spaced from one another and subjected to different temperatures; and means responsive to the pressure in said system when all liquid is present in the first mentioned portion for changing from the inactive phase of the cycle of the circulating means to the running phase and responsive to a predetermined pressure in the system when part of the liquid is contained in the other portion of the system for changing from said running phase to the inactive phase.

23. Refrigerating apparatus comprising in combination, a heat absorber; means for cyclically circulating refrigerant through the absorber, each of said cycles including a running phase and an inactive phase; and control means including a closed system containing a volatile liquid, one portion of said system having a capacity variable with changes in temperature, means responsive solely and at all times to the temperature of the heat absorber for varying the capacity of said portion, the quantity of liquid contained in said system and the capacity of said portion being such that all of said liquid is contained in said portion under one normal operating temperature of said temperature responsive means and under another normal operating temperature of the temperature responsive means the capacity of said portion is insufficient to hold all said liquid, a second portion of said system being connected with the first mentioned portion to receive the excess liquid when the first mentioned portion is at the second mentioned operating temperature, said second mentioned portion being subjected to the medium cooled by the heat absorber, and means responsive to the pressure in said system when all liquid is present in the first mentioned portion for changing from the inactive phase of the cycle of the circulating means to the running phase and responsive to a predetermined pressure in the system when part of the liquid is contained in the other portion of the system for changing from said running phase to the inactive phase.

WALTER V. HOBBS.